Oct. 27, 1925.
J. A. WHIPPLE
1,558,956
GEAR SHIFT PEDAL LATCH
Filed Dec. 11, 1924
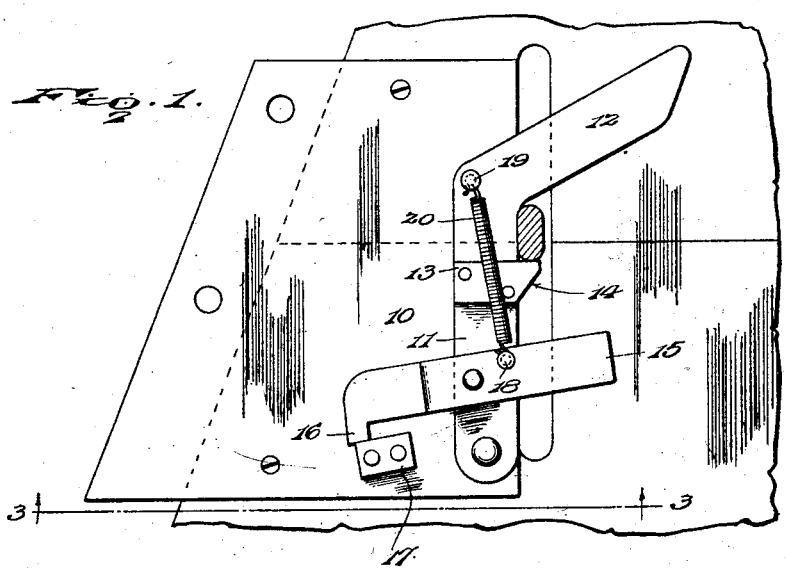
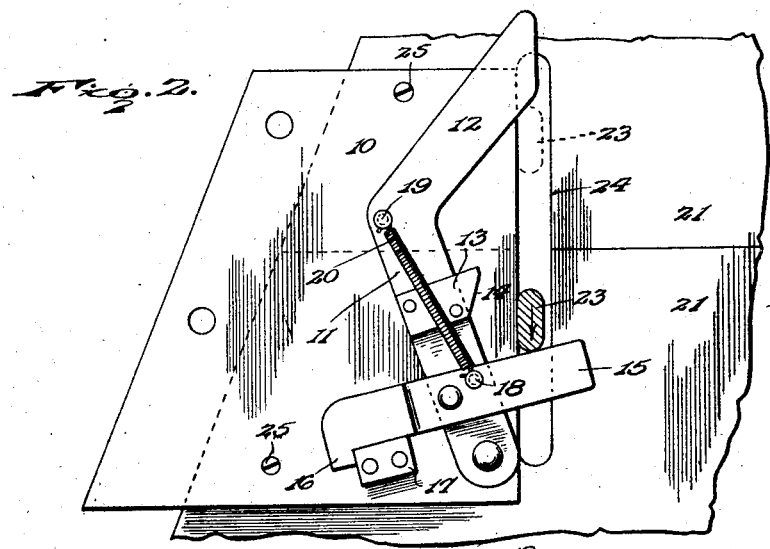
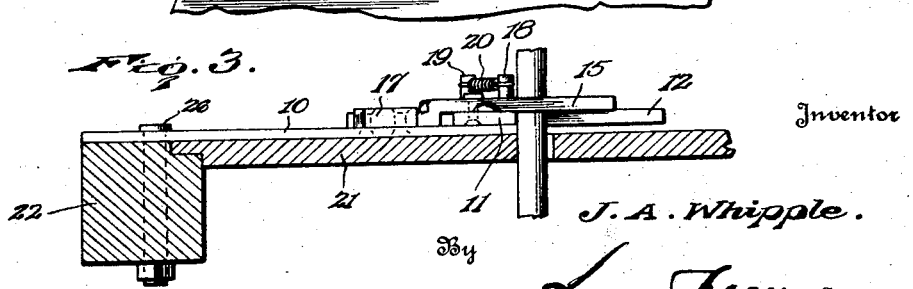
Inventor
J. A. Whipple.
By Lacey & Lacey, Attorneys Patented Oct. 27, 1925.

1,558,956

UNITED STATES PATENT OFFICE.

JAMES ALBERT WHIPPLE, OF CHICO, CALIFORNIA.

GEAR-SHIFT-PEDAL LATCH.

Application filed December 11, 1924. Serial No. 755,248.

*To all whom it may concern:*

Be it known that I, JAMES ALBERT WHIPPLE, a citizen of the United States, residing at Chico, in the county of Butte and State of California, have invented certain new and useful Improvements in Gear-Shift-Pedal Latches, of which the following is a specification.

This invention relates to an improved neutral latch for Ford vehicles and seeks, among other objects, to provide a device of this character to coact with the clutch pedal of the vehicle for automatically locking the clutch pedal in neutral position.

The invention seeks, as a further object, to provide a device adapted to be automatically released by the clutch pedal so that, when desired, the clutch pedal may be permitted to move rearwardly for rendering the high speed of the vehicle active.

And the invention seeks, as a still further object, to provide a device which will be of particularly simple construction and which may be readily applied.

Other and incidental objects will appear hereinafter.

In the accompanying drawings:

Figure 1 is a plan view showing my improved device applied and illustrating the clutch pedal in neutral position.

Figure 2 is a view similar to Figure 1 but showing the manner in which the clutch pedal is adapted to automatically release the device.

Figure 3 is a fragmentary sectional view on the line 3—3 of Figure 1, looking in the direction indicated by the arrows.

In carrying the invention into effect, I employ a base member or plate 10 having a straight inner edge and pivoted upon said plate adjacent the inner edge thereof is an angle shaped lever 11 having an obliquely directed terminal 12. Fixed to the lever adjacent the crotch formed by said terminal is a stop member 13 projecting at the inner side edge of the lever and provided with a beveled end edge 14. Adjacent its inner end, the lever carries a latch 15 which is pivoted at a point substantially midway between its ends upon the lever and at its outer end is, as shown in Figure 3, offset to slidably rest upon the plate 10. Formed on the outer end of said latch is a lug or hook 16 and fixed to the plate 10 for engagement by said hook, is an obliquely disposed block 17. Upstanding from the inner end portion of the latch adjacent the pivot point thereof is a pin 18 and upstanding from the lever 11 at the angle therein is a like pin 19. Extending between said pins is a spring 20 pressing the outer end of the lever against the block 17.

For convenience, I have shown the device applied. The front floor boards of a Ford vehicle are indicated at 21 and the adjacent side sill of the vehicle body at 22. The stock or shank of the usual clutch pedal of the vehicle is indicated at 23 while the customary slot in the floor boards which receives the pedal stock, is indicated at 24. In connection with the clutch pedal it is desired to note that, as is well known, this pedal is movable forwardly for rendering the low speed gear of the vehicle transmission active and is movable rearwardly, under the action of the vehicle clutch spring, to permit the high speed gear of the transmission to become active, while the pedal is further movable to a middle neutral position when no one of the gears of the transmission is active. In other words, when the pedal is in middle position, the transmission is in neutral. In mounting the present device, the plate 10 is rested against the floor boards 21 at the left of the slot 24 so that, as best shown in Figure 3 of the drawings, the inner straight edge of the plate overhangs the adjacent side wall of the slot, and securing the plate to the floor boards are screws or other suitable fastening devices 25. Bolts 26 are also preferably employed to extend through the sill 22 for connecting the outer end of the plate with said sill. Thus, the plate will be rigidly held in position.

Attention is now directed to the fact that since the outer end of the latch 15 will always be limited in its rearward movement by the block 17, the latch will serve to anchor the spring 20 so that the spring will function to swing the forward end of the lever 11 in the direction of the clutch pedal stock and will normally hold the lever against said stock. Accordingly, when the clutch pedal is pushed forwardly to neutral position, as shown in Figure 1, the pedal stock will coact with the inclined edge 14 of the stop 13 for swinging the lever to the left, as seen in the drawings, until the pedal stock clears said stop, when the spring 20 will return the lever to the right to project the stop behind the stock. Thus, when the foot is removed from the clutch pedal, the stop 13 will serve to limit the pedal against rearward movement and accordingly lock the pedal in neutral position.

Assuming now that it is desired to release the clutch pedal, the pedal is rocked forwardly from the position shown in Figure 1, toward the dotted line position shown in Figure 2, when the pedal stock will coact with the terminal 12 of the lever 11 for swinging the lever to the left until the lug 16 of the latch 15 clears the outer end of the block 17. The spring 20 will then, as shown in Figure 2, snap said lug into engagement with the outer end of the block for latching the lever in retracted position. Thus, the stop 13 will be held out of the path of the pedal stock. The dotted line showing of the pedal stock in Figure 2, is intended to approximate the position of the clutch pedal when shifted forwardly for rendering the low speed of the vehicle transmission active and, as will be seen, as soon as the lever 11 is latched in retracted position, the pedal may freely move rearwardly until, as shown in full lines in Figure 2, the pedal stock strikes the inner end of the latch 15. As the pedal continues in its rearward movement, the stock will thus trip the latch and release the lever 11 to be returned to the right against the stock by the spring 20. Thus, as will be seen, the device is entirely automatic in its operation, being controlled by the movement of the clutch pedal. As wear occurs upon the low gear band of the transmission, the pedal will, of course, travel further forward from the dotted line position of Figure 2, and, as will be observed, the end edge of the terminal 12 of the lever 11 is disposed to lie parallel to the slot 24 when the lever is swung fully to the left so that the pedal stock will ride along said edge. No adjustment in the device will, therefore, be required for different cars.

Having thus described the invention, what I claim is:

1. A pedal latch including a pivoted lever having a stop for limiting the pedal in its rearward movement and provided with a portion to coact with the pedal for swinging the lever and shifting said stop away from the pedal when the pedal is moved forwardly, and means carried by the lever for latching the lever when swung as well as returning the lever when released and disposed to be tripped by the pedal.

2. A pedal latch including a pivoted lever having a stop for limiting the pedal in its rearward movement and provided at its free end with an obliquely disposed terminal to coact with the pedal for swinging the lever and shifting said stop away from the pedal when the pedal is moved forwardly, and means for latching the lever when swung as well as returning the lever when released and disposed to be tripped by the lever.

3. A pedal latch including a pivoted lever having a stop for limiting the pedal in its rearward movement and provided with a portion to coact with the pedal for swinging the lever and shifting said stop away from the pedal when the pedal is moved forwardly, a latch block, and a pivoted latch carried by the lever to engage said block for latching the lever when swung and disposed to be tripped by the pedal.

4. A pedal latch including a pivoted lever having a stop for limiting the pedal in its rearward movement and provided with a portion to coact with the pedal for swinging the lever and shifting said stop away from the pedal when the pedal is moved forwardly, a latch block, a pivoted latch carried by the lever to engage said block for latching the lever when swung and disposed to be tripped by the pedal, and a spring extending between the latch and lever for actuating the latch as well as returning the lever when released.

5. A pedal latch including a base member, a lever pivoted thereon and provided with a pedal stop as well as a portion to coact with a pedal for swinging the lever when the pedal is moved, a latch block carried by the base member, a pivoted latch carried by the lever to engage said block for latching the lever when swung, and a spring extending between the latch and lever for pressing the latch to coact with the block as well as return the lever when swung, the latch being disposed to be tripped by the pedal.

In testimony whereof I affix my signature.

JAMES ALBERT WHIPPLE. [L. S.]